United States Patent
Loosen et al.

(10) Patent No.: US 10,103,369 B2
(45) Date of Patent: Oct. 16, 2018

(54) BATTERY RETAINING DEVICE FOR SECURING A VEHICLE BATTERY TO A VEHICLE BODY OF A VEHICLE

(71) Applicant: Robert Bosch GmbH, Stuttgart (DE)

(72) Inventors: Stephan Loosen, Mundelsheim (DE); Armin Schuelke, Aidlingen (DE); Steffen Derhardt, Gerlingen (DE); Anton Paweletz, Fellbach (DE); Gian Antonio D'Addetta, Stuttgart (DE); Niluefer Baba, Stuttgart (DE); Remigius Has, Grafenau-Daetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/501,933

(22) PCT Filed: Jul. 22, 2015

(86) PCT No.: PCT/EP2015/066714
§ 371 (c)(1),
(2) Date: Feb. 6, 2017

(87) PCT Pub. No.: WO2016/020193
PCT Pub. Date: Feb. 11, 2016

(65) Prior Publication Data
US 2017/0229691 A1    Aug. 10, 2017

(30) Foreign Application Priority Data
Aug. 6, 2014 (DE) .......... 10 2014 215 513

(51) Int. Cl.
*H01M 2/00* (2006.01)
*H01M 2/10* (2006.01)

(52) U.S. Cl.
CPC ...... *H01M 2/1083* (2013.01); *H01M 2220/20* (2013.01)

(58) Field of Classification Search
CPC .............................. H01M 2/1083; B60K 1/04
(Continued)

(56) References Cited

U.S. PATENT DOCUMENTS

| 4,058,182 A | 11/1977 | Huber |
| 6,158,538 A | 12/2000 | Botzelmann et al. |

(Continued)

FOREIGN PATENT DOCUMENTS

| DE | 2522844 | 12/1976 |
| DE | 19738620 | 12/1998 |

(Continued)

OTHER PUBLICATIONS

International Search Report for Application No. PCT/EP2015/066714 dated Oct. 8, 2015 (English Translation, 2 pages).

*Primary Examiner* — Abdullah Riyami
*Assistant Examiner* — Nader Alhawamdeh
(74) *Attorney, Agent, or Firm* — Michael Best & Friedrich LLP (57) ABSTRACT

The invention relates to a battery retaining device, comprising a guide device which is designed to receive a vehicle battery; at least one retaining element which is designed to rigidly retain a vehicle battery received in the guide device in a mechanical manner up to a first maximum retaining force value in a first operating state and to rigidly retain the vehicle battery received in the guide device in a mechanical manner up to a second maximum retaining force value in a second operating state; and an actuator system with at least one actuator which is designed to bring the at least one retaining element from the first operating state to the second operating state.

10 Claims, 4 Drawing Sheets

(58) Field of Classification Search
USPC .......................................... 180/68.5; 429/61
See application file for complete search history.

(56) References Cited

U.S. PATENT DOCUMENTS

| | | | |
|---|---|---|---|
| 8,592,069 B1 | 11/2013 | Anderson et al. | |
| 2004/0226765 A1 | 11/2004 | Mathews et al. | |
| 2015/0053492 A1* | 2/2015 | Kolatschek | B60K 1/04 |
| | | | 180/68.5 |
| 2017/0229691 A1* | 8/2017 | Loosen | H01M 2/1083 |

FOREIGN PATENT DOCUMENTS

| | | | |
|---|---|---|---|
| DE | 102004023754 | 12/2004 | |
| DE | 102008059680 | 6/2010 | |
| DE | 102010012109 | 10/2010 | |
| DE | 102011016081 | 11/2011 | |
| DE | 102012204856 | 10/2013 | |
| DE | 102012204856 A1 * | 10/2013 | ............ B60K 1/04 |
| DE | 102012012060 | 12/2013 | |
| DE | 102013220139 | 4/2014 | |
| EP | 0559176 | 9/1993 | |

\* cited by examiner

BATTERY RETAINING DEVICE FOR SECURING A VEHICLE BATTERY TO A VEHICLE BODY OF A VEHICLE

BACKGROUND OF THE INVENTION

The invention relates to a battery retaining device for securing a vehicle battery to a vehicle body of a vehicle, in particular a traction battery in an electrically driven vehicle, such as an electric vehicle or a hybrid vehicle.

Electric vehicles and hybrid vehicles have traction batteries, which store the necessary electric energy to drive the vehicle. Such traction batteries have a high storage capacity for ensuring a high cruising range for the vehicles, so that the mass of the traction batteries can comprise several hundred kilograms. Particularly in the case of a vehicle collision or an impact of the vehicle, a strong shear force on the vehicle body can result from the high mass of the traction batteries.

The type of mounting of the traction battery to the vehicle body therefore plays a decisive role in the stability behavior of the vehicle in the case of a collision. During a collision—or in general during an unusual deceleration process, such as, for example, an emergency braking—all objects of the vehicle with mass or respectively in the interior vehicle, such as passengers or luggage, are exposed to a pulsed acceleration, which requires an even greater acceleration force, the greater the mass of the decelerated object. The temporal profiles of the acceleration of the individual objects, the respective mass contribution thereof, the kinematics thereof and the energetic proportion of the total balance of the kinetic energy are therefore decisive for the temporal profile of the total system: vehicle.

In order to advantageously influence the temporal course of the acceleration of the total system in the case of a vehicle collision, connection systems between vehicle battery and vehicle body are known, which mechanically decouple the battery including the supporting structure thereof temporarily and in a controlled manner from the vehicle body. The decoupling has the effect that the battery mass passes through its own movement trajectory during the vehicle collision, and as a result the acceleration forces on the battery and the passengers of the vehicle can be more advantageously configured.

The European patent publication EP 0 559 176 A1 discloses a system with a battery carrier, which is displaced during a frontal collision in the vehicle longitudinal axis and simultaneously energy absorption means transfer kinetic energy of the battery to the vehicle body.

The German patent publication DE 197 38 620 C1 discloses a battery retaining system for vehicle batteries, in which lateral guide elements at least partially allow a movement of the vehicle battery when impact occurs.

The German patent publication DE 10 2004 023 754 A1 discloses a battery mounting system for the battery of a motor vehicle, comprising a battery carrier which is fastened to the floor within a cab of the motor vehicle, a movement converter for displacing the battery carrier as a reaction to an impact on the cab brought about by a collision and a subsequent axial deformation of the floor of the cab.

The German patent publication DE 10 2013 220 139 A1 discloses a device for securing a battery in an electric vehicle, said device comprising a battery frame respectively housing for accommodating a vehicle battery. In so doing, a recessed shell or respectively a recessed compartment can be provided which is designed to receive the battery housing that accommodates the vehicle battery.

The German patent publication DE 10 2008 059 680 A1 discloses a device for retaining a battery in a motor vehicle, said device comprising a receiving element for receiving a battery, a bracket element, which at least partially surrounds the receiving element and/or the battery to be retained, and a fixing element, which can be attached to the bracket element, wherein the battery is fixed by means of the fixing element within the receiving element.

The German patent publication DE 10 2012 012 060 A1 discloses, for example, a deformation element for absorbing the kinetic harming energy that occurs during a crash of two collision partners by deforming as a result of a force effect. The deformation element has a deformation resistance, which can be adapted to the intensity of the crash, and said deformation element is mechanically coupled to at least one actuator. A predeformation can be applied to the deformation element by activating the actuator.

The German patent publication DE 10 2012 204 856 A1 discloses a ground-coupling arrangement for a vehicle comprising a ground-receiving element for receiving a grounding object, a guide arrangement by means of which the ground-receiving element is mounted movably relative to the vehicle and comprising an actuator which is designed to adjust the degree of the coupling of the ground-receiving element to the vehicle and/or the temporal profile of said coupling.

The German patent publication DE 10 2011 016 081 A1 discloses a device for receiving at least one battery by means of a retaining device in or on a vehicle, said retaining device comprising a number of deformable fastening elements.

The German patent publication DE 25 22 844 A1 discloses a vehicle comprising a storage battery which is fastened to the vehicle floor via a retaining bracket. The retaining brackets have devices which upon impact of the vehicle cause a release of the storage battery from the vehicle floor when a certain impact strength has been exceeded.

The German patent publication DE 10 2010 012 109 A1 discloses a vehicle comprising an energy storage unit which is arranged on a body structure of the vehicle. In so doing, the body structure has receiving elements, on which the energy storage unit is arranged, wherein said energy storage unit can be pivoted and/or displaced if a collision of the vehicle occurs.

There is however a need for flexible solutions for securing a vehicle battery with respect to the vehicle body in the case of impact, wherein said solutions allow the temporal deceleration profile of the vehicle battery to be influenced during a vehicle collision.

SUMMARY OF THE INVENTION

According to a first aspect, the present invention therefore relates to a battery retaining device, comprising a guide device which is designed to receive a vehicle battery, at least one retaining element which is designed to rigidly retain a vehicle battery received in the guide device in a mechanical manner up to a first maximum retaining force value in a first operating state and to rigidly retain the vehicle battery received in the guide device in a mechanical manner up to a second maximum retaining force value in a second operating state; and an actuator system with at least one actuator which is designed to bring the at least one retaining element from the first operating state to the second operating state.

According to a second aspect, the present invention relates to a mounting system for securing a vehicle battery to a vehicle body of a vehicle, comprising a battery retaining device according to the first aspect of the invention and a vehicle battery which is retained in the battery retaining device.

According to a third aspect, the present invention relates to a vehicle, comprising a vehicle body and a mounting system according to the second aspect of the invention, the battery retaining device being rigidly connected to the vehicle body in a mechanical manner.

A concept of the present invention is to actively influence the temporal profile of the acceleration of a vehicle battery with respect to the vehicle body of the vehicle comprising the vehicle battery by means of possibly an electrically or pyrotechnically operated actuator system. By means of the actuator system, retaining elements for the vehicle battery with respect to the vehicle body can be selectively set into a structurally weakened state. This takes place by means of an actively controlled change in the structural integrity or geometric position of retaining elements. A retaining force on the vehicle battery with respect to the guide or respectively mounting system thereof is reduced or eliminated by means of the irreversible structural damage to said retaining elements. This enables the vehicle battery to move freely along the guide device on the battery side and at least temporarily not to contribute to the effective total mass of the vehicle during a process of strong deceleration.

The safety of the passengers of the vehicle as well as the protection of the traction battery can be favorably increased by means of the mounting system according to the invention. The acceleration of the traction battery can be optimally regulated during a vehicle collision by means of the fast reacting, adjustable and controllable actuator system.

To this end, actuators are used for the actuator system which can vary the movability, position or mechanical rigidity of the associated retaining elements. The length and magnitude of the actuation by the actuators can be calculated via a central control device, which, for example, can use instantaneous values of the acceleration ascertained from acceleration sensors or other suitable sensors of the vehicle and/or the vehicle battery.

By virtue of the fact that the actuators are coupled in a suitable manner to retaining elements of the battery retaining device for a vehicle battery, the selective temporary actuation of the actuators leads to as temporarily controllable change in the mechanical degree of coupling of the vehicle battery to the vehicle body. During the vehicle collision (or generally during a phase of high vehicle deceleration), the battery ground can be moved from a state of being coupled to the vehicle structure to one of being decoupled from the vehicle structure or at least to a partially decoupled state. This change in state is generally irreversible depending on the retaining elements used.

In an advantageous manner, the battery retaining device influences the deceleration acting on the entire vehicle in such a way that the load and therefore the risk of injury to the passengers are significantly reduced in comparison to a vehicle without a battery retaining device. In addition, the loads which act on the battery during a vehicle collision are significantly reduced, whereby the risk of damage to the battery itself is correspondingly reduced.

According to one embodiment of the battery retaining device according to the invention, the battery retaining device can furthermore comprise a control device, which is designed to actuate the actuator system for changing the operating position of the at least one retaining element as a function of sensor signals, which indicate in which state of deceleration the battery retaining device is located.

According to a further embodiment of the battery retaining device according to the invention, the at least one retaining element can have a rotatable locking bar with a taper in the width direction, wherein the vehicle battery received in the guide device presses perpendicularly to the width direction against the rotatable locking bar in the first operating state and presses along the width direction against the rotatable locking bar in the second operating state and wherein the actuator system is designed to rotate the rotatable locking bar perpendicularly to the width direction.

According to a further embodiment of the battery retaining device according to the invention, the at least one retaining element can have a locking bar, which retains a vehicle battery received in the guide device and which has a predetermined breaking point, which is mounted at the height of a wedge tip of a wedge mounted fixedly on the guide device in the second operating state; and the actuator system can be designed to displace the locking bar perpendicularly to the wedge tip of the wedge.

According to a further embodiment of the battery retaining device according to the invention, the at least one retaining element can have at least one membrane which exerts a retaining force against a vehicle battery received in the guide device; and the actuator system can be designed to introduce a tear or structural damage into the membrane in the second operating state.

According to a further embodiment of the battery retaining device according to the invention, the at least one membrane can have a perforation, whereat the actuator system introduces the tear or the structural damage into the membrane.

BRIEF DESCRIPTION OF THE DRAWINGS

Further features and advantages of embodiments of the invention ensue from the following description with reference to the attached drawings.

In the drawings.

Identical reference signs generally denote similar or similarly acting components. The schematic depictions shown in the figures are only of an exemplary nature, which for reasons of clarity are illustrated in an ideal manner. It goes without saying that the depicted components are used only to illustrate principles and functional aspects of the present invention.

DETAILED DESCRIPTION

Figure 1:
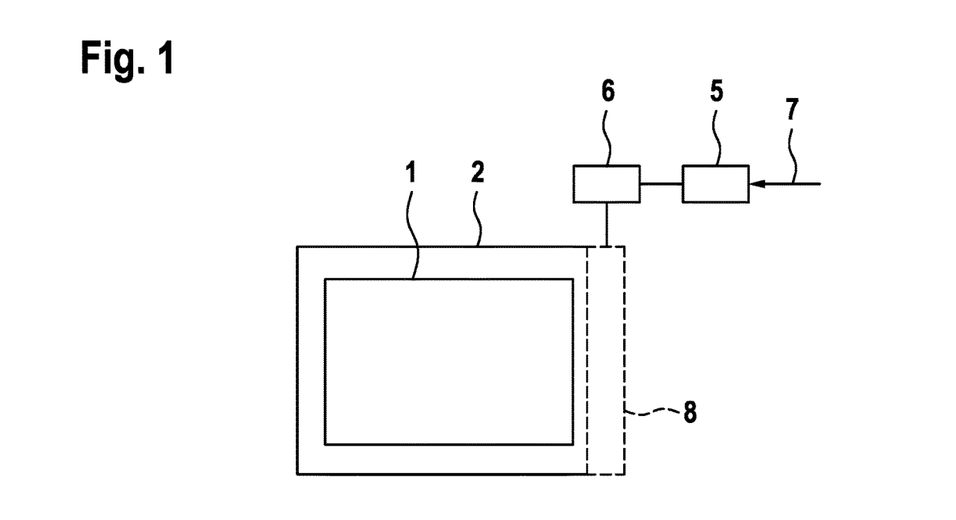
FIG. 1 shows a schematic depiction of a mounting system for the mechanical mounting of a vehicle battery to a vehicle body according to one embodiment of the present invention.

FIG. 1 shows a general depiction of a mounting system for the mechanical mounting of a vehicle battery 1 to the vehicle body. FIGS. 2 to 6 show in each case schematic depictions of special embodiment variants of mounting systems 100 to 500 for the mechanical mounting of a vehicle battery 1 to a vehicle body.

The general concept of the mounting system of FIG. 1 is initially described below, which is used as a basis for the modifications of FIGS. 2 to 6. For reasons of clarity, the control device 5 and the actuator system 6 are not always explicitly depicted in FIGS. 2 to 6.

The vehicle battery 1 is depicted in each case with a cuboid housing, wherein the outer form of the battery housing can however take on any other shape. The vehicle battery 1 can (not explicitly depicted) have pole terminals via which battery cables of different polarity for removing and feeding electrical energy can be attached. The vehicle battery can, for example, comprise a rechargeable electrical energy storage, for example a lead accumulator, a lithium-ion accumulator or a secondary cell of another kind.

The mounting systems 100 to 500 generally have a battery retaining device 2, which is provided with a guide device on the battery side. The guide device on the battery side is used to receive the vehicle battery 1, in which the vehicle battery 1, depending on the locking state or respectively operating state of the battery retaining device 2, generally can be shifted or displaced with respect to the battery retaining device 2 in one dimension. The battery retaining device 2 can particularly be arranged in the vehicle such that the degree of freedom of movement of the vehicle battery 1 is oriented along the direction of movement of the vehicle, i.e. such that the vehicle battery 1 can carry out only a translational movement in the direction of the direction of movement of the vehicle.

The battery retaining device 2 can in each case be connected in a mechanical manner to the vehicle body 3 of the vehicle (only indicated schematically). The battery retaining device 2 is thus fixed with respect to the vehicle body 3 in the relative position thereof. In the locked state, the battery retaining device 2 therefore provides a rigid mechanical coupling of the vehicle battery 1 to the vehicle body 3 of the vehicle; whereas in the unlocked state of the battery retaining device 2, the vehicle battery 1 is temporarily decoupled from the vehicle body 3 of the vehicle at least in the direction of the degree of freedom of movement of the vehicle battery 1 with respect to the battery retaining device 2.

A control device 5 can be provided in each of the FIGS. 1 to 6, with which an actuator system 6 can be adjusted and controlled. The actuator system can, for example, be operated electrically and comprise actuators, which can exert adjustment forces on retaining elements 8 that in each case can be changed in the position, situation and/or outer form thereof in order to transfer the battery retaining device 2 from a locked state to an unlocked state and if applicable back into the locked state. Alternatively or additionally, the actuator system 6 can also be operated or supported pyrotechnically.

The control device 5 can operate the actuator system 6 as a function of external sensor signals 7, which indicate in which acceleration or deceleration state the total system of the vehicle is currently located. As a result, the retaining elements 8 can, for example, be released by the actuator system 6 in the case of impending collisions or during emergency braking in order to temporarily decouple the vehicle battery 1 from the vehicle body 3 during the critical driving operation situation.

Figure 2:
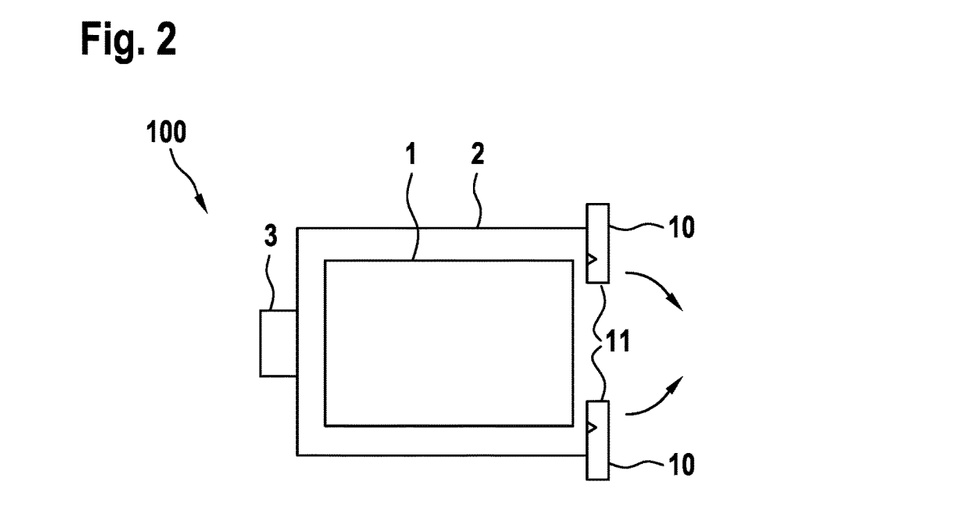
FIG. 2 shows a schematic depiction of a mounting system for the mechanical mounting of a vehicle battery to a vehicle body according to a further embodiment of the present invention.

FIG. 2 shows a mounting system 100 comprising a battery retaining device 2, which has a guide device that is designed to receive a vehicle battery 1. Two retaining elements 10 are attached to the battery retaining device 2 as a locking bar with predetermined breaking points 11. The predetermined breaking points 11 can be construction related, structural weak points, which selectively and predictably fail as a result of mechanical or physical measures or as a result of designs that selectively and predictably fail when a force on the locking bar 10 is exceeded in order to localize a breakage or buckling of the locking bar 10 at the predetermined breaking point 11. The predetermined breaking points 11 can, for example, be formed by notches, incisions or tapers. A vehicle battery 1 received in the guide device is fixedly held in a mechanical manner by the locking bar 10 as long as a retaining force acting on the locking bar 10 does not exceed a first predetermined value for the retaining force. When this predetermined value has been exceeded, for example during deceleration of the vehicle battery 1 and an inertia force resulting therefrom, the locking bars 10 break at the predetermined breaking points 11 and enable a translational movement of the vehicle battery 1 accommodated in the guide device.

Figure 3:
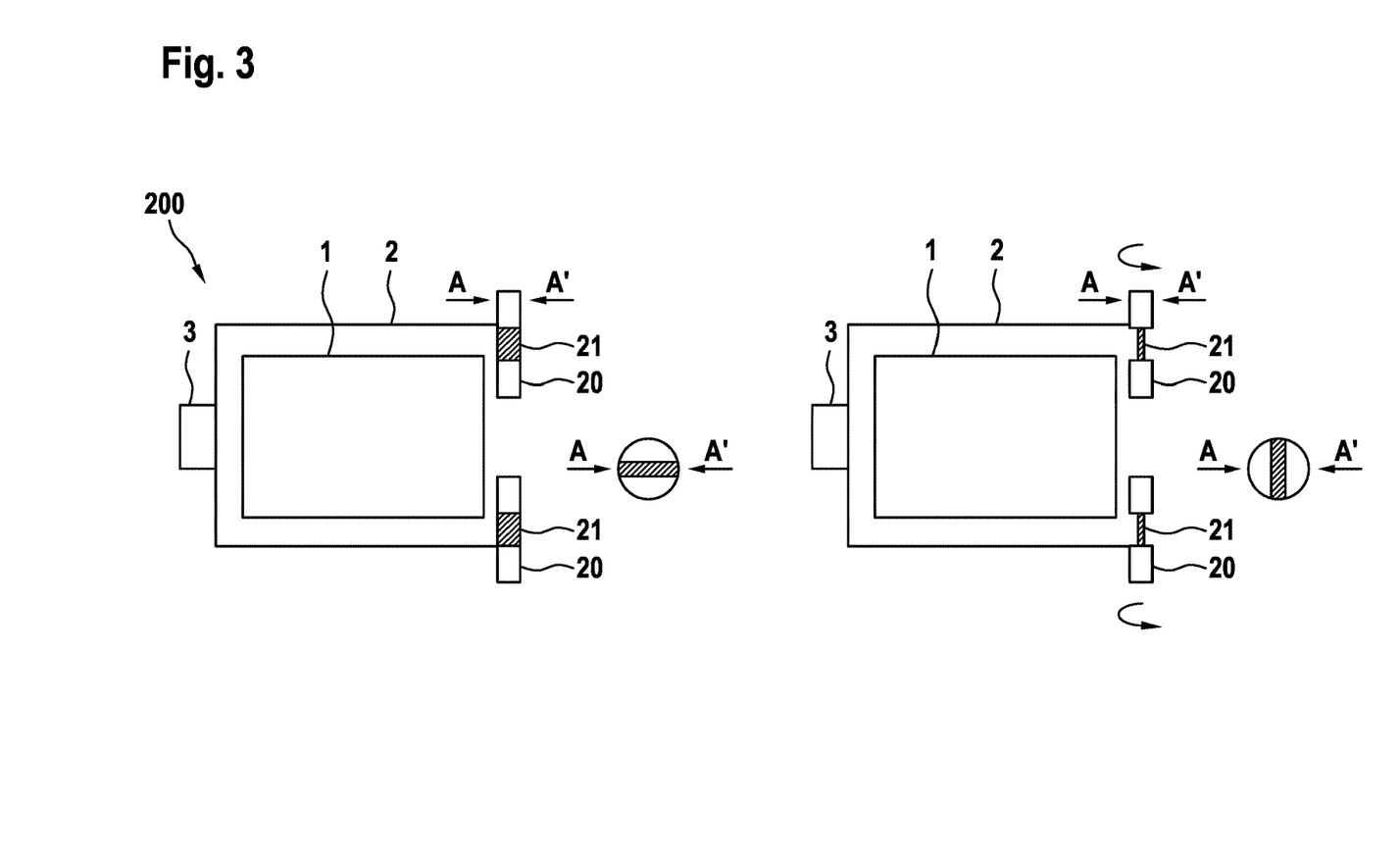
FIG. 3 shows a schematic depiction of a mounting system for the mechanical mounting of a vehicle battery to a vehicle body according to a further embodiment of the present invention.

FIG. 3 shows a mounting system 200 comprising a battery retaining device 2, which substantially differs from the mounting system 100 of FIG. 2 in that retaining elements 20 are provided, which are designed to rigidly retain a vehicle battery 1 received in the guide device in a mechanical manner up to a first maximum retaining force value in a first operating state and to rigidly retain the vehicle battery 1 received in the guide device in a mechanical manner up to a second maximum retaining force value in a second operating state. The first maximum retaining force value is thereby greater than the second maximum retaining force value. The retaining elements 20 can in this case have rotatable locking bars 20 having a taper 21 in a width direction. The locking bars 20 can—as indicated in the cross-sectional depiction A-A' in FIG. 3—have a cylindrical shape and have a taper 21 in a central region. The taper 21 is formed by notches or material removal from the lateral surface of the cylinder along a width orientation of the locking bar 20.

In a first operating state (on the left in the drawing), the taper is oriented with respect to the vehicle battery such that an inertia force of the vehicle battery 1 acts longitudinally on the taper 21 during a deceleration, i.e. the locking bar 20 has full material strength along the direction of action of the inertia force of the vehicle battery 1. In a second operating state (on the right in the drawing), in which the locking bar 20 is rotated along the cylinder axis about an angle of 90°, the vehicle battery 1 received in the guide device presses along the width direction against the rotatable locking bar 20; thus enabling the locking bar 20 to have a reduced material strength along the direction of action of the inertia force of the vehicle battery 1. That means that the structural resistance force of the locking bar 20 is considerably reduced with respect to an inertia force of the vehicle battery 1 in the second operating state; and the locking bar 20 can break off or buckle at the tapered point 20 in order to release the vehicle battery with respect to a translational movement.

Figure 4:
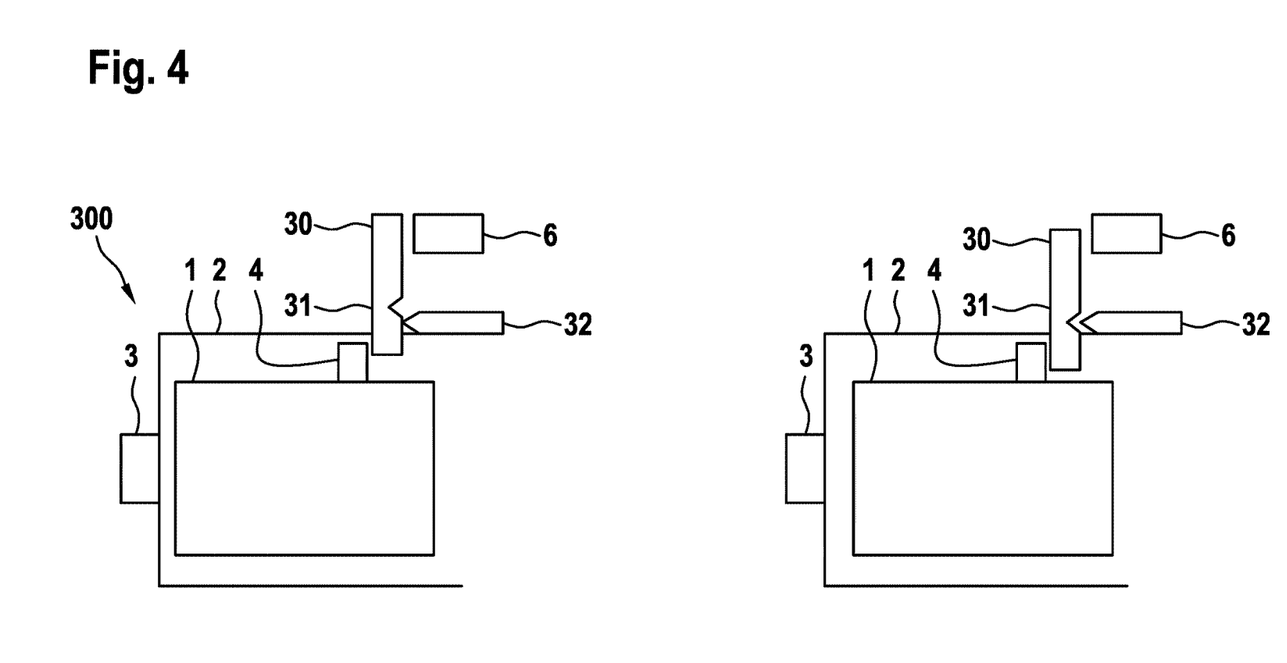
FIG. 4 shows a schematic depiction of a mounting system for the mechanical mounting of a vehicle battery to a vehicle body according to a further embodiment of the present invention.

FIG. 4 shows a mounting system 300 comprising a battery retaining device 2. The battery retaining device 2 has a locking bar 30 which retains a vehicle battery 1 received in the guide device. The locking bar 30 has a predetermined breaking point 31 which is mounted at the height of a wedge tip of a wedge 32 fixedly mounted on the guide device in the second operating state. The predetermined breaking point 31 can, for example, be a notch, which corresponds in the shape thereof to the outer shape of the wedge tip of the wedge 20. As a result, the wedge 32, which, for example, can be resiliently mounted, strikes into the notch and exerts a high point force on the predetermined breaking point 31.

In comparison to the first operating state shown on the left hand side of the drawing, the second operating shown on the right hand side of the drawing requires a substantially lower maximum retaining force in order to drive the wedge 32 into the predetermined breaking point and in so doing to break off the lower part of the locking bar 30. As a result, the lower part of the locking bar can no longer retain the vehicle battery 1, whereby the vehicle battery 1 is enabled to make a translational movement in the guide device. The actuator system is used to displace the locking bar 30 perpendicularly to the wedge tip of the wedge 32, for example via as resilient mounting or a worm drive.

Figure 5:
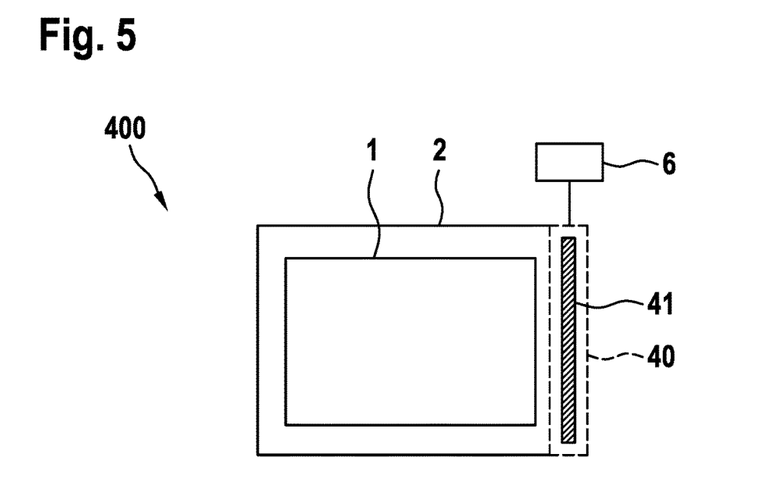
FIG. 5 shows a schematic depiction of a mounting system for the mechanical mounting of a vehicle battery to a vehicle body according to a further embodiment of the present invention.

FIG. 5 shows a mounting system 400 comprising a battery retaining device 2. The battery retaining device 2 has a membrane 40 which exerts a retaining force on a vehicle battery received in the guide device. After damage to or respectively destruction of the membrane, this retaining force is reduced or has completely disappeared thus enabling the vehicle battery to move in a translational manner with respect to the guide device. The membrane 40 is provided with at least one structural weak point, such as a perforation 41 or a predetermined breaking point 41, which can, for example, be pyrotechnically supported, torn or structurally damaged via an actuation of the actuator system 6. Provision can also be made for a mounting of the membrane to be damaged or destroyed instead of the membrane 40 itself. The membrane 40 can, for example, have a plastic plate, a sheet metal plate or a rubber surface.

Figure 6:
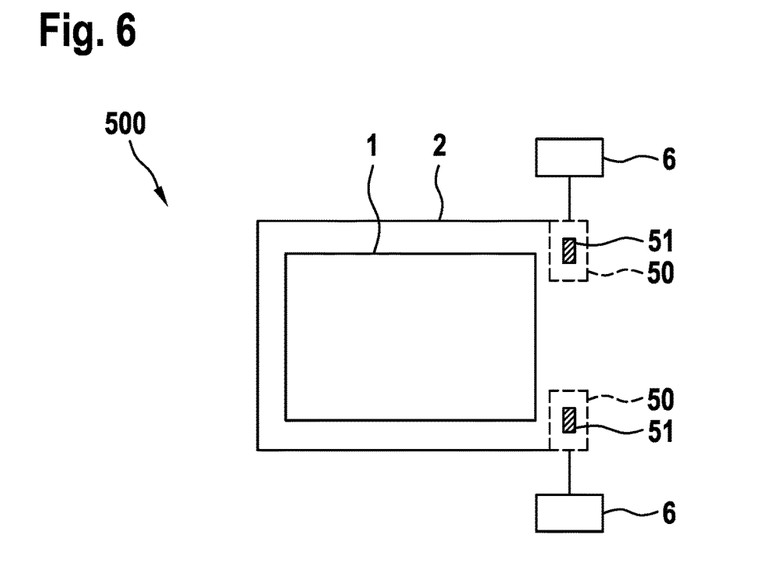
FIG. 6 shows a schematic depiction of a mounting system for the mechanical mounting of a vehicle battery to a vehicle body according to a further embodiment of the present invention.

FIG. 6 shows a mounting system 500 comprising a battery retaining device 2, which differs substantially from the mounting system 400 in FIG. 5 only in that membranes 50 are provided on both sides of the guide device as retaining elements. Both membranes 50 can likewise be provided with structural weak points, such as, for example, perforations 51, which can be, for example, pyrotechnically supported, torn or structurally damaged via an actuation of the actuator system 6.

What is claimed is:

1. A battery retaining device, comprising:
a guide device which is configured to receive a vehicle battery;
at least one retaining element which is configured to rigidly retain the vehicle battery received in the guide device in a mechanical manner up to a first maximum retaining force value in a first operating state and to rigidly retain the vehicle battery received in the guide device in a mechanical manner up to a second maximum retaining force value in a second operating state; and
an actuator system with at least one actuator which is configured to bring the at least one retaining element from the first operating state to the second operating state,
wherein the at least one retaining element comprises a rotatable locking bar having a taper in a width direction, wherein the vehicle battery received in the guide device presses perpendicularly to the width direction against the rotatable locking bar in the first operating state and presses along the width direction against the rotatable locking bar in the second operating state, and wherein the actuator system is configured to rotate the rotatable locking bar perpendicularly to the width direction.

2. The battery retaining device according to claim 1, further comprising:
a control device which is configured to actuate the actuator system for changing the operating system of the at least one retaining element as a function of sensor signals, which indicate in which state of deceleration the battery retaining device is located.

3. A mounting system for mounting a vehicle battery to a vehicle body of a vehicle, comprising:
a battery retaining device according to claim 1; and
a vehicle battery which is retained in the battery retaining device.

4. A vehicle comprising:
a vehicle body; and
a mounting system including a battery retaining device and a vehicle battery retained in the battery retaining device,
wherein the battery retaining device includes a guide device which is configured to receive a vehicle battery, at least one retaining element which is configured to rigidly retain the vehicle battery received in the guide device in a mechanical manner up to a first maximum retaining force value in a first operating state and to rigidly retain the vehicle battery received in the guide device in a mechanical manner up to a second maximum retaining force value in a second operating state, and an actuator system with at least one actuator which is configured to bring the at least one retaining element from the first operating state to the second operating state, and
wherein the battery retaining device is rigidly connected to the vehicle body in a mechanical manner,
wherein the at least one retaining element comprises a rotatable locking bar having a taper in a width direction, wherein the vehicle battery received in the guide device presses perpendicularly to the width direction against the rotatable locking bar in the first operating state and presses along the width direction against the rotatable locking bar in the second operating state, and wherein the actuator system is configured to rotate the rotatable locking bar perpendicularly to the width direction.

5. The vehicle according to claim 4, further comprising:
a control device which is configured to actuate the actuator system for changing the operating system of the at least one retaining element as a function of sensor signals, which indicate in which state of deceleration the battery retaining device is located.

6. A battery retaining device, comprising:
a guide device which is configured to receive a vehicle battery;
at least one retaining element which is configured to rigidly retain the vehicle battery received in the guide device in a mechanical manner up to a first maximum retaining force value in a first operating state and to rigidly retain the vehicle battery received in the guide device in a mechanical manner up to a second maximum retaining force value in a second operating state; and an actuator system with at least one actuator which is configured to bring the at least one retaining element from the first operating state to the second operating state, wherein the at least one retaining element comprises a locking bar which retains a vehicle battery received in the guide device and which has a predetermined breaking point which is mounted at the height of a wedge tip of a wedge rigidly mounted to the guide device, and wherein the actuator system is configured to displace the locking bar perpendicularly to the wedge tip of the wedge.

7. The battery retaining device according to claim 6, further comprising:

a control device which is configured to actuate the actuator system for changing the operating system of the at least one retaining element as a function of sensor signals, which indicate in which state of deceleration the battery retaining device is located.

8. A mounting system for mounting a vehicle battery to a vehicle body of a vehicle, comprising:

a battery retaining device according to claim 6; and a vehicle battery which is retained in the battery retaining device.

9. A vehicle comprising:

a vehicle body; and a mounting system including a battery retaining device and a vehicle battery retained in the battery retaining device, wherein the battery retaining device includes a guide device which is configured to receive a vehicle battery, at least one retaining element which is configured to rigidly retain the vehicle battery received in the guide device in a mechanical manner up to a first maximum retaining force value in a first operating state and to rigidly retain the vehicle battery received in the guide device in a mechanical manner up to a second maximum retaining force value in a second operating state, and an actuator system with at least one actuator which is configured to bring the at least one retaining element from the first operating state to the second operating state, and wherein the battery retaining device is rigidly connected to the vehicle body in a mechanical manner, wherein the at least one retaining element comprises a locking bar which retains a vehicle battery received in the guide device and which has a predetermined breaking point which is mounted at the height of a wedge tip of a wedge rigidly mounted to the guide device, and wherein the actuator system is configured to displace the locking bar perpendicularly to the wedge tip of the wedge.

10. The vehicle according to claim 9, further comprising:

a control device which is configured to actuate the actuator system for changing the operating system of the at least one retaining element as a function of sensor signals, which indicate in which state of deceleration the battery retaining device is located.

* * * * *